US011675555B1

(12) United States Patent
Tsujimura

(10) Patent No.: US 11,675,555 B1
(45) Date of Patent: Jun. 13, 2023

(54) PRINTER FOR PRINTING ON A LONG SHEET AND METHOD THEREFOR

(71) Applicant: TOSHIBA TEC KABUSHIKI KAISHA, Tokyo (JP)

(72) Inventor: Hisashi Tsujimura, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/704,353

(22) Filed: Mar. 25, 2022

(51) Int. Cl.
*G06F 3/12* (2006.01)
*H04N 1/00* (2006.01)

(52) U.S. Cl.
CPC .......... *G06F 3/1251* (2013.01); *G06F 3/1208* (2013.01); *G06F 3/1241* (2013.01); *H04N 1/0071* (2013.01); *H04N 1/00721* (2013.01)

(58) Field of Classification Search
CPC .... G06F 3/1251; G06F 3/1208; G06F 3/1441; G06F 3/1241; H04N 1/0071; H04N 1/00721
USPC ........................................................ 358/1.13
See application file for complete search history.

(56) References Cited

U.S. PATENT DOCUMENTS

| 5,222,157 | A | * | 6/1993 | Yoneda | G06F 16/40 |
| | | | | | 358/403 |
| 7,573,606 | B2 | * | 8/2009 | Nomoto | G06F 3/1208 |
| | | | | | 358/1.9 |
| 2013/0045851 | A1 | * | 2/2013 | Hori | G06F 3/1204 |
| | | | | | 493/405 |
| 2018/0203645 | A1 | * | 7/2018 | Ito | G03G 15/0848 |
| 2019/0347053 | A1 | * | 11/2019 | Aoyama | G06F 3/125 |
| 2021/0303218 | A1 | * | 9/2021 | Nakamura | G06F 3/1285 |

FOREIGN PATENT DOCUMENTS

| JP | H04-99665 A | 3/1992 |
| JP | H06-266870 A | 9/1994 |
| JP | 2002-108627 A | 4/2002 |

* cited by examiner

*Primary Examiner* — Allen H Nguyen
(74) *Attorney, Agent, or Firm* — Foley & Lardner LLP

(57) ABSTRACT

A printer for printing on a long sheet includes a print data divider and a verification processor. The print data divider outputs a plurality of segments of divided print data divided at the boundary of areas from standard print data containing print contents in each of the areas obtained by dividing a standard sheet into a plurality of areas. The verification processor compares the size of the long sheet with the size of the area included in the standard sheet and rotates the divided print data if it is determined from a result of the comparison that the rotation is necessary.

4 Claims, 8 Drawing Sheets

PRINTER FOR PRINTING ON A LONG SHEET AND METHOD THEREFOR

FIELD

Embodiments described herein relate generally to a printer.

BACKGROUND

In a related art, there are a printer (first printer) that prints and outputs on a standard sheet such as A4-sized paper, and a printer (second printer) that uses strip-shaped paper (long paper) as a printing medium.

Also, there is a type of standard sheet called an address label. The address label has a plurality of labels on which addresses of mail are printed, and which are attached side by side on a mount which is a standard sheet. Furthermore, there is a type of standard sheet called a business card. The business card has dotted cuts and cut lines that enable a standard sheet to be cut into the size of the business card.

Similarly, some long sheets used by the second printer have a plurality of labels attached side by side on a strip-shaped mount.

When printing on each of the areas obtained by dividing a standard sheet into a plurality of areas as described above, as data to be input to the first printer, data containing the print contents for each area of the standard sheet (standard print data) is prepared.

Here, there is a case where it is desired to use the second printer instead of the first printer at the site where the above-mentioned standard print data is provided and the print output is actually performed. However, since the standard print data is premised on print output on a standard sheet, if the standard print data is used as is without modification as the print data for the second printer, the print contents will exceed the label, which makes it more difficult or impossible to obtain the desired output.

Therefore, an object of the present disclosure is to provide a printer that can obtain a desired output on a long sheet by using print data on the premise of print output to each of the areas obtained by dividing a standard sheet into a plurality of areas.

DETAILED DESCRIPTION

Figure 1:
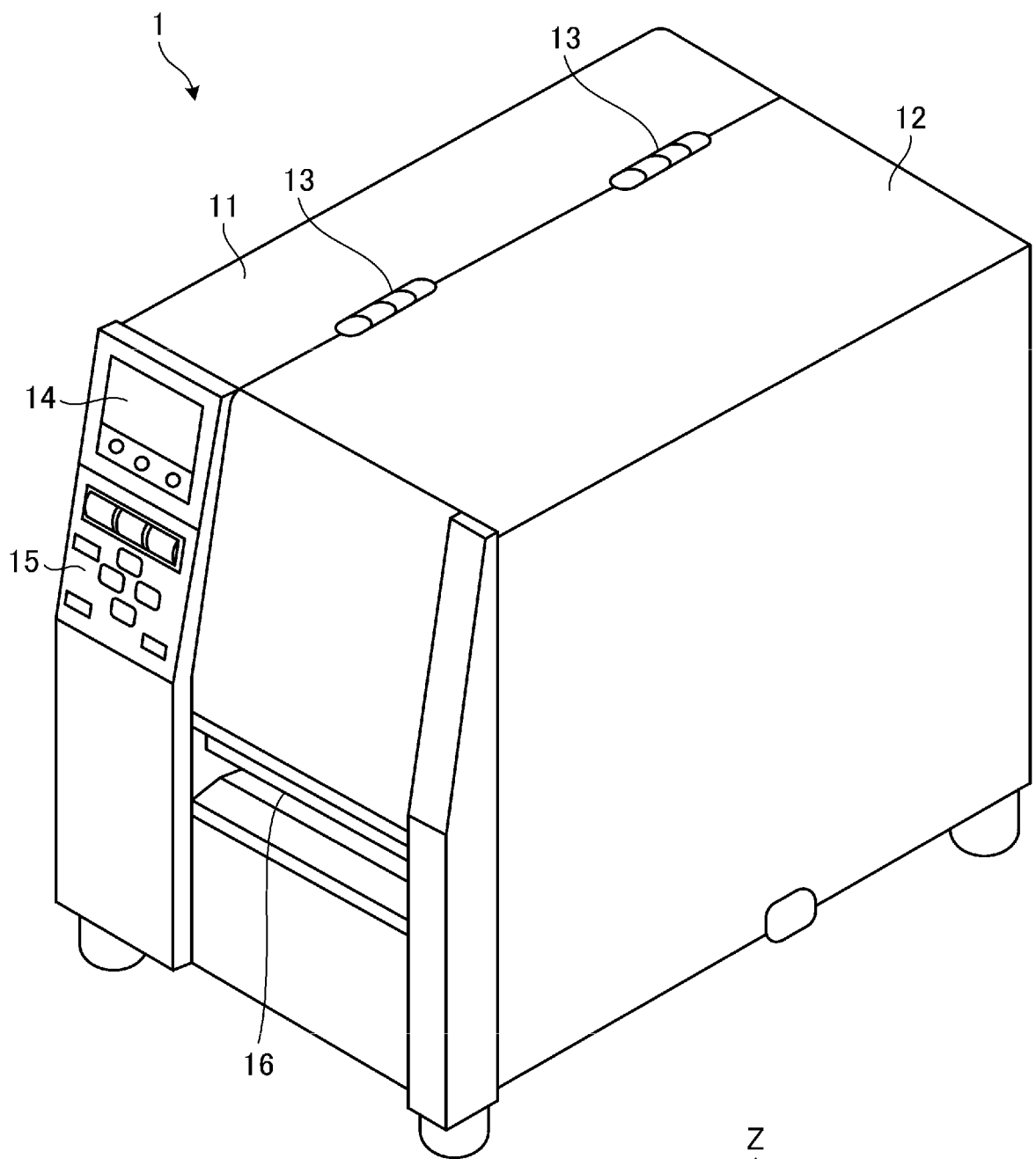
FIG. 1 is a perspective view showing an embodiment of the appearance of a printer.

In general, according to one embodiment, a printer for printing on a long sheet includes a print data dividing unit or a print data divider and a check processing unit or a verification processor. The print data dividing unit or the print data divider outputs a plurality of pieces or segments of divided print data divided at the boundary of areas from standard print data containing print contents in each of the areas obtained by dividing a standard sheet into a plurality of areas. The check processing unit or the verification processor compares the size of the long sheet with the size of the area included in the standard sheet and rotates the divided print data if it is determined from the result of the comparison that the rotation is necessary.

Hereinafter, embodiments of a printer will be described with reference to the attached drawings. The embodiment described below is an embodiment of the printer and does not limit the configuration, specifications, and the like. The printer of the embodiment is an example of a printer that transfers ink of an ink ribbon to a printing medium.

In the following description, a three-dimensional Cartesian coordinate system composed of the X-axis, Y-axis, and Z-axis is used. The X-axis is the width direction (horizontal direction) of a printer 1, the Y-axis is the depth direction (front-back direction) of the printer 1, and the Z-axis is the height direction (vertical direction) of the printer 1. Further, in the drawings, the direction indicated by the arrow is the positive direction, the positive direction of the Y-axis is the rear side of the printer 1 and the positive direction of the Z-axis is the upper side.

FIG. 1 is a perspective view showing an example of the appearance of the printer 1 according to the embodiment. The printer 1 includes a left side cover 11, a right side cover 12, a hinge 13, a liquid crystal monitor 14, an operation switch 15, a dispensing port 16, and the like. Hereinafter, the side on which the dispensing port 16 is provided will be described as the front surface of the printer 1.

The left side cover 11 covers the left side (X-axis negative side) of the printer 1 toward the dispensing port 16. The right side cover 12 covers the right side (X-axis positive side) of the printer 1 toward the dispensing port 16. The hinge 13 connects the left side cover 11 and the right side cover 12 and is formed along the Y-axis. The left side cover 11 opens the inside of the left side of the printer 1 by rotating around the hinge 13. Further, the right side cover 12 opens the inside of the right side of the printer 1 by rotating around the hinge 13.

The liquid crystal monitor 14 and the operation switch 15 are provided in front of the left side cover 11. The liquid crystal monitor 14 displays the operating state of the printer 1 and the like. The operation switch 15 receives various settings and operation instructions for the printer 1.

The dispensing port 16 is provided in front of the right side cover 12. The dispensing port 16 dispenses (discharges, ejects) a printing medium on which various information is printed.

Figure 2:
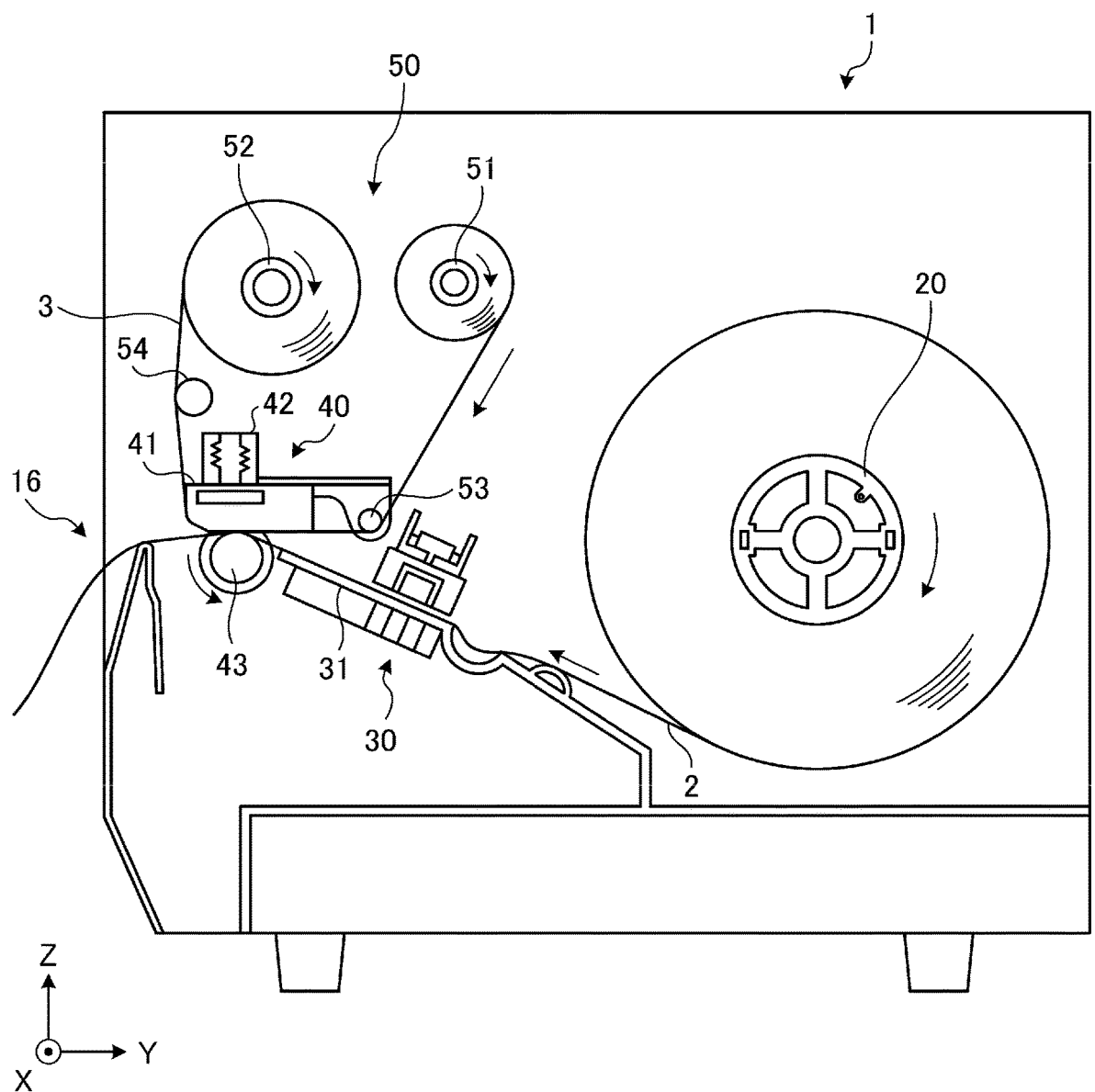
FIG. 2 is a schematic cross-sectional view showing an embodiment of the internal structure of the printer.

FIG. 2 is a schematic cross-sectional view showing an example of the internal structure of the printer 1. More specifically, FIG. 2 is a schematic cross-sectional view seen from the positive side of the X-axis with the right side cover 12 of the printer 1 opened. The printer 1 includes a sheet holding unit or a sheet holder 20, a sheet conveying unit or a sheet conveyor 30, a printing unit 40, and an ink ribbon supply unit or an ink ribbon supplier 50, inside the right side cover 12.

The sheet holding unit 20 is a rotating shaft that holds roll paper in which a strip-shaped sheet (long sheet) 2 is wound into a roll shape. The long sheet 2 is an example of a printing medium.

As the long sheet 2, the printer 1 can use a sheet having various surface conditions, such as plain paper, matte paper, and glossy paper. Further, as the long sheet 2, the printer 1 can use a sheet having various thicknesses, such as thick paper and thin paper. Further, as the long sheet 2, the printer 1 can use a sheet having various forms, such as a label sheet in addition to the usual receipt sheet. The label sheet includes labels having predetermined dimensions (those having a glue layer on the back of the printing surface) attached side by side on a strip-shaped mount, and strip-shaped labels without a mount.

Further, in FIG. 2, the long sheet 2 is set in the printer 1 in the form wound in a roll shape, but in practice, the long sheet 2 in the form of a fanfold sheet may be set in the printer 1. The fanfold sheet is a sheet in a state in which the long sheet 2 is folded in a bellows shape. Further, the printing medium may be a film or cloth other than paper.

The sheet conveying unit 30 conveys the long sheet 2 held by the sheet holding unit 20 in the direction of the dispensing port 16, that is, the longitudinal direction of the long sheet 2. The sheet conveying unit 30 includes a conveyance guide unit 31 or a conveyance guide 31, a label sensor (not shown), and the like. The conveyance guide unit 31 guides the position of the long sheet 2 in the width direction if the long sheet 2 is conveyed toward the dispensing port 16. The label sensor (not shown) detects the position of the label attached to the strip-shaped mount.

The printing unit 40 prints various information on the long sheet 2 being conveyed. The printing unit 40 includes a print head 41, a print head pressing unit or a print head press 42, and a platen 43.

The print head 41 is, for example, a thermal head that transfers ink of an ink ribbon 3 to the long sheet 2. The print head 41 is not limited to the thermal head and may be a dot impact type head.

The print head pressing unit 42 presses the print head 41 against the ink ribbon 3 at the time of printing. The platen 43 is a roller that rotates by the driving force of a motor 44 (see FIG. 3). Then, the platen 43 sandwiches the long sheet 2 with the print head 41 via the ink ribbon 3. With such a configuration, the printing unit 40 prints various information while conveying the long sheet 2.

The ink ribbon supply unit 50 includes a ribbon holding unit or a ribbon holder 51, a ribbon winding unit or a ribbon winder 52, a first guide shaft 53, and a second guide shaft 54.

The ribbon holding unit 51 is a rotating shaft that holds and rotates an unused ink ribbon 3 wound in a roll shape. The ribbon winding unit 52 is a rotating shaft for winding the printed ink ribbon 3 drawn from the ribbon holding unit 51.

The first guide shaft 53 is a rotating shaft that guides the ink ribbon 3 held by the ribbon holding unit 51 to the printing unit 40. The second guide shaft 54 is a rotating shaft that guides the ink ribbon 3 used in the printing unit 40 to the ribbon winding unit 52.

The long sheet 2 and the ink ribbon 3 conveyed in this way are sandwiched between the print head 41 and the platen 43 in the printing unit 40. Then, at the portion heated by the print head 41, the ink of the ink ribbon 3 is melted and transferred to the long sheet 2, and printing is performed.

After that, the long sheet 2 printed by the printing unit 40 is dispensed (discharged, ejected) from the dispensing port 16.

Figure 3:
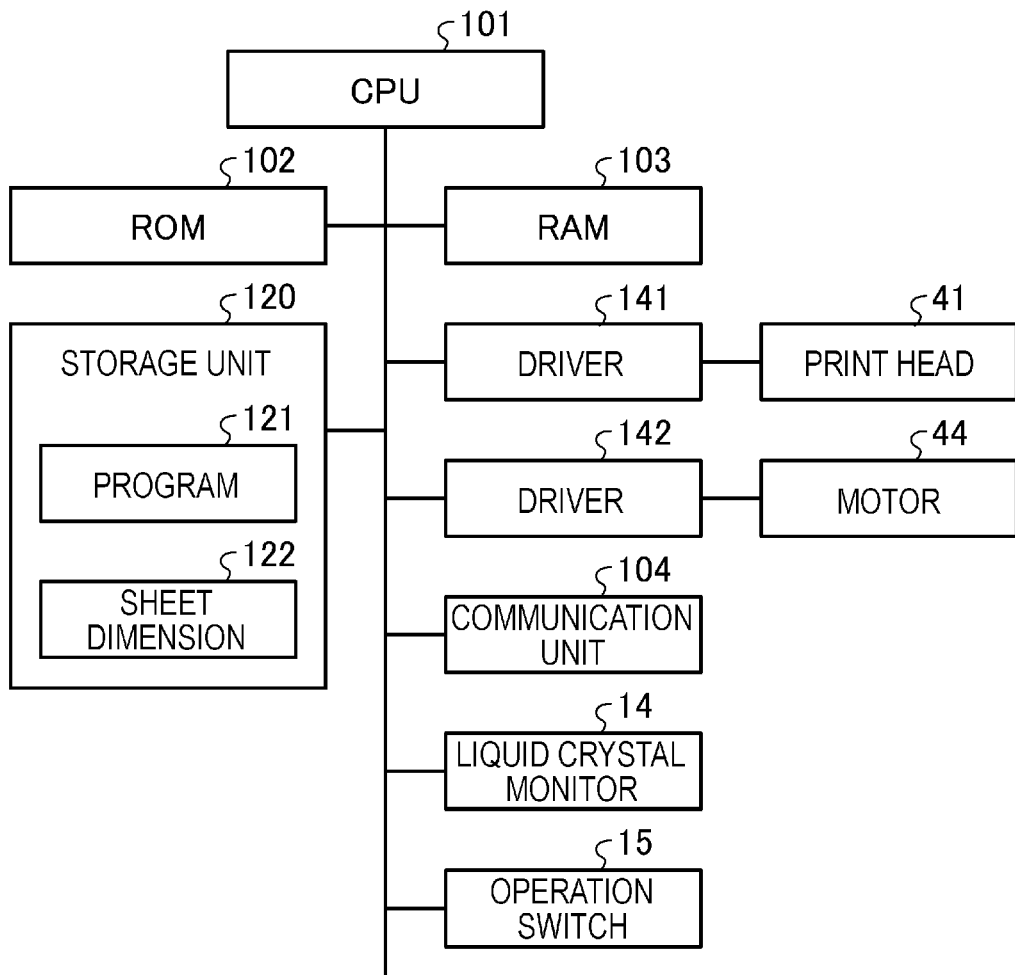
FIG. 3 is a block diagram showing an embodiment of the hardware configuration of the printer.

Next, the hardware configuration of the printer 1 will be described with reference to FIG. 3. FIG. 3 is a block diagram showing an example of the hardware configuration of the printer 1. The printer 1 includes a CPU (Central Processing Unit) 101, a ROM (Read Only Memory) 102, a RAM (Random Access Memory) 103, a communication unit or a communication interface 104, a storage unit or a storage 120, drivers 141 and 144, and the like.

The CPU 101 is an example of a processor and comprehensively controls the operation of the printer 1. The ROM 102 stores various programs. The RAM 103 is a workspace for loading programs and various data. The CPU 101, the ROM 102, and the RAM 103 are connected via a bus or the like to form a control unit or a controller 110 (see FIG. 4) of a computer configuration. The control unit or the controller 110 may include one processor or multiple processors. The control unit 110 executes various processes by operating the CPU 101 according to a program stored in the ROM 102 or the storage unit 120 and loaded in the RAM 103.

The control unit 110 is connected to the communication unit 104 and the storage unit 120 via a bus or the like. The communication unit 104 is an interface for communicating with an external device such as a server or a PC (Personal Computer) so that data can be transmitted and received. The communication unit 104 receives, for example, print data to be printed by the printing unit 40 from the external device.

The storage unit 120 is composed of a non-volatile memory such as a flash memory and maintains the stored contents even if the power supply is cut off. The storage unit 120 stores, for example, a program 121, a sheet dimension 122 (described later), and the like.

The program 121 is a program for implementing the functions of the printer 1. The program 121 may be provided by being incorporated in the ROM 102 in advance. Further, the program 121 may be configured to be recorded as a file in a format that can be installed or executed in the control unit 110, and provided on a recording medium that can be read by a computer, such as a CD-ROM, a flexible disc (FD), a CD-R, or a DVD (Digital Versatile Disc). Further, the program 121 may be configured to be provided by being stored on a computer connected to a network such as the Internet and downloaded via the network. Further, the program 121 may be configured to be provided or distributed via a network such as the Internet.

The driver 141 drives the print head 41 based on the print data. The driver 142 drives the motor 44 based on the print data. The motor 44 is, for example, a stepping motor, and conveys the long sheet 2 by rotationally driving the platen 43.

The liquid crystal monitor 14 displays a display screen based on an instruction from the control unit 110. Further, the operation switch 15 detects operation information of the operator and transmits the detected operation information to the control unit 110.

Figure 4:
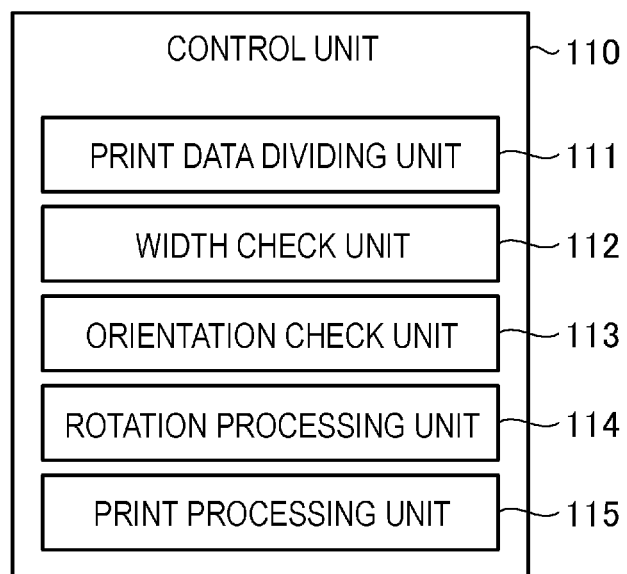
FIG. 4 is a functional block diagram showing an embodiment of the functional configuration of the printer.

Next, the functional configuration of the printer 1 will be described with reference to FIG. 4. FIG. 4 is a functional block diagram showing an example of the functional configuration included in the printer 1. If the CPU 101 operates according to the program 121, the control unit 110 functions as various functional units such as a print data dividing unit or a print data divider 111, a width check unit or a width verifier 112, an orientation check unit or an orientation verifier 113, a rotation processing unit or a rotator 114, and a print processing unit or a print processor 115.

Figure 5A:
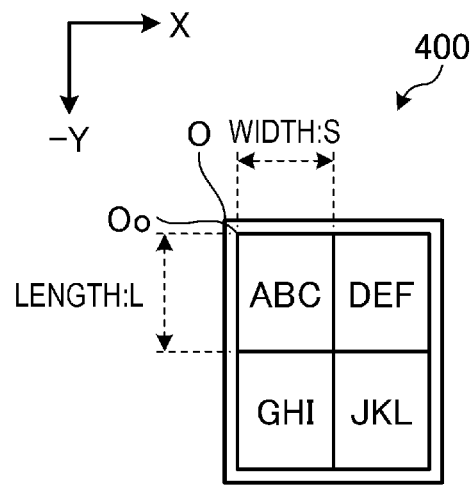
FIG. 5A is a diagram showing an embodiment of print data received by the printer.

Here, FIG. 5A is a diagram showing an example of standard print data 400 received by the printer 1 of the present embodiment. The standard print data 400 is print data designed to be suitable for standard sheets such as A4-sized paper, assuming print output by a laser printer or the like, and the data format thereof is, for example, PDF.

On the other hand, the printer 1 of the present embodiment handles the long sheet 2 which is a strip-shaped sheet as a printing medium. Therefore, the control unit 110 appropriately processes the standard print data 400 by various functional units to make it possible to be printed on the long sheet 2 and passes the processed standard print data 400 to the driver 141.

The process of print data performed by the control unit 110 will be described in detail. First, it is assumed that the standard print data 400 shown in FIG. 5A is a PDF format file suitable for A4 sized standard sheet. In the standard print data 400, an origin O is the upper left corner in the direction in which the characters can be read. Further, the upper left corner of the print range on the paper surface is set as an offset coordinate Oo. The "−Y" axis shown in FIG. 5A and the like is the sheet conveyance direction (negative direction of the Y axis).

The standard print data 400 is suitable for a printing medium in which four sheets are arranged in two rows with the short side of a dimension S facing in the width direction and in two stages with the long side of a dimension L facing the length direction from the offset coordinates Oo of the A4 sized standard sheet. Here, the sheet may be a label attached to a standard mount or may be a sheet obtained by cutting the standard sheet into a plurality of pieces or segments. In the former case, the standard sheet is a mount to which a label is attached.

Figure 5B:
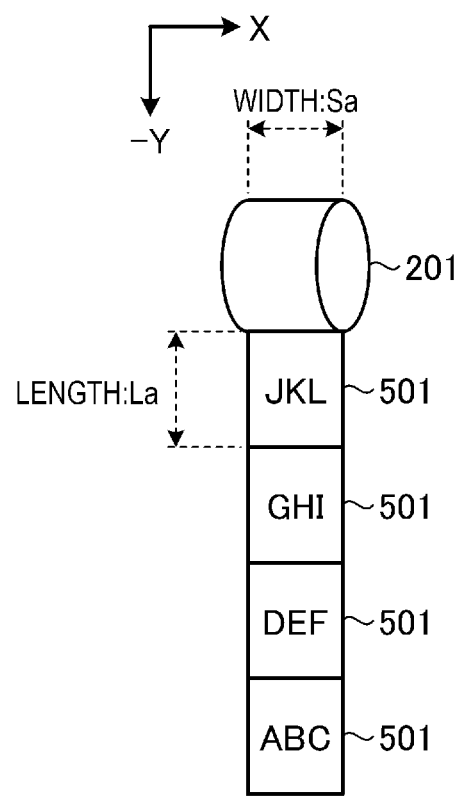
FIG. 5B is a diagram showing an embodiment of the output state of printing by the printer.
Figure 5C:
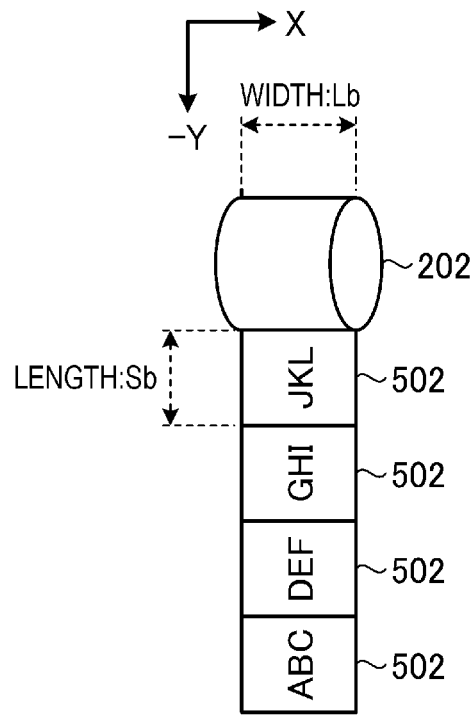
FIG. 5C is a diagram showing an embodiment of the output state of printing by the printer.

The operation of the control unit 110 and the functions of each functional units of the control unit 110 will be described with an example of a case where the standard print data 400 is output to a long sheet 201 having a width of a dimension Sa shown in FIG. 5B and to a long sheet 202 having a width of a dimension Lb shown in FIG. 5C. FIGS. 5B and 5C are diagrams showing an example of the output state of printing by the printer 1 of the present embodiment.

The long sheet 201 is a series of sheets in which the short side of the dimension Sa is directed in the width direction and the long side of a dimension La is directed in the length direction. Further, the long sheet 202 is a series of sheets in which the long side of the dimension Lb is directed in the width direction and the short side of a dimension Sb is directed in the length direction.

Here, in the long sheets 201 and 202 used as substitutes for the standard sheets, the size of the sheet included in the long sheets 201 and 202 is close to the size of the sheet included in the standard print data 400. More specifically, as the long sheets 201 and 202, those in which the size of the sheet included in the long sheets 201 and 202 is substantially the same as or slightly larger than the size of the sheet included in the standard print data 400 are used.

That is, the long side dimension La of the sheet on the long sheet 201 and the long side dimension Lb of the sheet on the long sheet 202 are substantially the same as or slightly larger than the long side dimension L of the sheet on the standard print data 400. Further, the short side dimension Sa of the sheet on the long sheet 201 and the short side dimension Sb of the sheet on the long sheet 202 are substantially the same as or slightly larger than the short side dimension S of the sheet on the standard print data 400.

In order to output the standard print data 400 on the long sheet 201, print data 501 in which the print range of the standard print data 400 is divided into four by half vertically and horizontally may be sequentially output without changing the direction. Further, in order to output the standard print data 400 on the long sheet 202, print data 502 having the print range divided into four in the same way described above and further rotated by 90° counterclockwise may be sequentially output. The control unit 110 implements these operations by each functional unit described below.

Referring back to FIG. 4, the print data dividing unit 111 divides the standard print data 400 according to the boundary of the sheet included in the print data and outputs a plurality of pieces or segments of divided print data. The conversion from the standard print data 400 to the divided print data may be performed by dividing the standard print data 400 including a plurality of sheets into the portions each corresponding to one sheet, or by dividing the standard print data 400 into a state in which a plurality of sheets are arranged side by side.

The sheet dimension 122 stored in the storage unit 120 is used for processing by the above-mentioned print data dividing unit 111, width check unit 112, orientation check unit 113, and rotation processing unit 114. The storage unit 120 stores the size of the sheet suitable for the standard print data 400, the arrangement and size of the sheets included in the standard print data 400, the offset coordinate Oo, and the like, as the sheet dimensions. Further, the storage unit 120 also stores the width and length of the sheet on the long sheets 201 and 202 as the sheet dimensions.

The width check unit 112, the orientation check unit 113, and the rotation processing unit 114 form an example of the check processing unit or the verification processor. The check processing unit or the verification processor compares the sizes of the long sheets 201 and 202 with the sizes of the sheets included in the standard sheet and rotates the divided print data if it is determined from the result of the comparison that the rotation is necessary.

The width check unit 112 checks which of the short side and long side dimensions of the divided print data is suitable for the width dimensions of the long sheets 201 and 202.

The orientation check unit 113 checks whether the longitudinal direction of the divided print data in the readable orientation is suitable for the width direction or the length direction of the long sheet.

The rotation processing unit 114 prepares for the print output by the print processing unit 115 and the printing unit 40 and rotates the divided print data if it is determined from the outputs of the width check unit 112 and the orientation check unit 113 that the rotation is necessary. The angle of this rotation is 90° (90° clockwise) or 270° (90° counterclockwise).

In some embodiments, the check processing unit or the verification processor includes the width check unit 112, the orientation check unit 113, and the rotation processing unit 114. According to some embodiments, another operation may be employed so long as the function of the check processing unit or the verification processor is implemented.

The print processing unit 115 outputs the divided print data to the printing unit 40 and prints it out.

Figure 6:
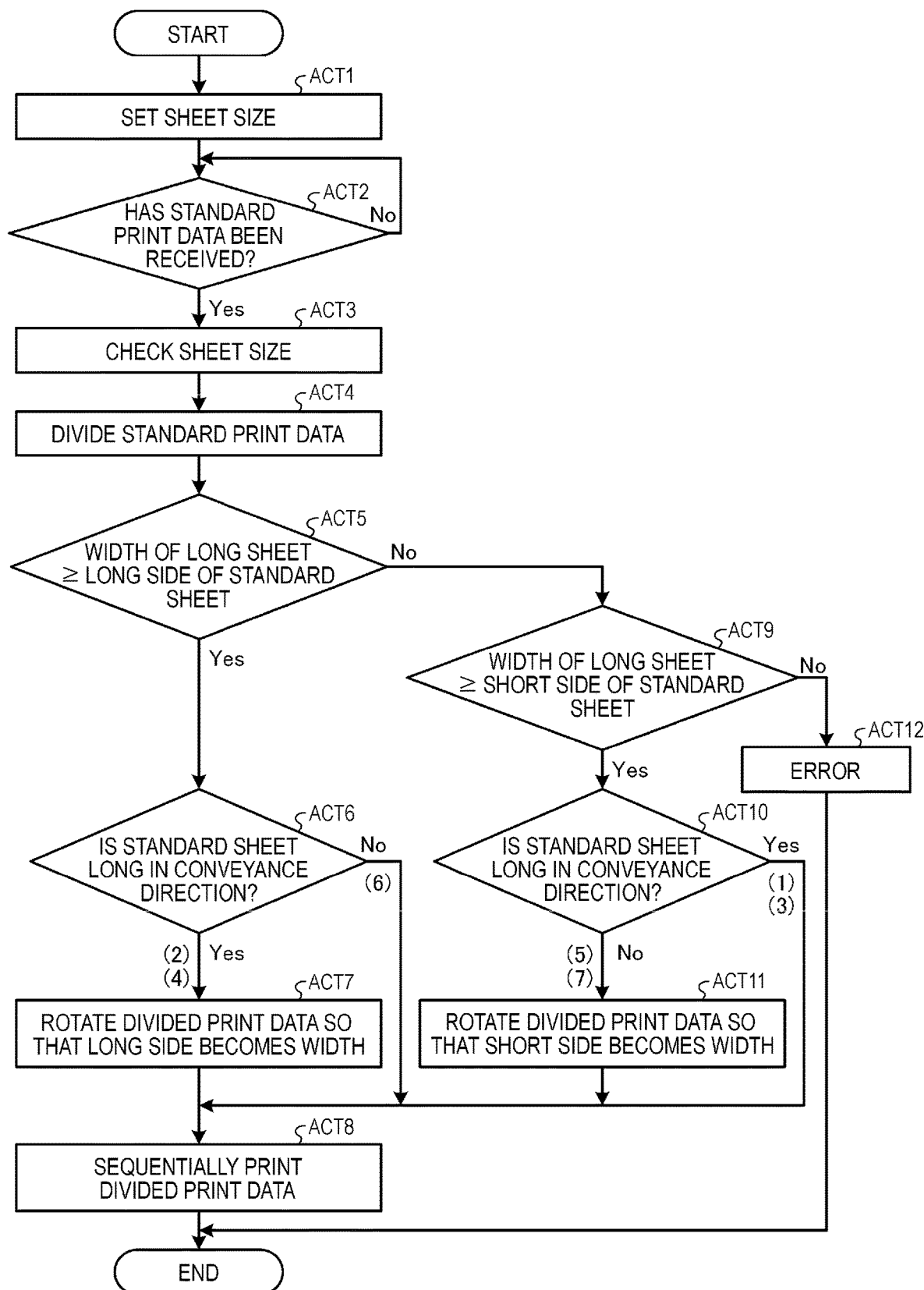
FIG. 6 is a flowchart showing an embodiment of the flow of processing performed by a control unit.

FIG. 6 is a flowchart showing an example of the flow of processing performed by the control unit 110. Further, FIG. 7 is a diagram showing conversion examples (1) to (7) of various standard print data 400 to 403 to various long sheets 201 to 203.

Figure 7:
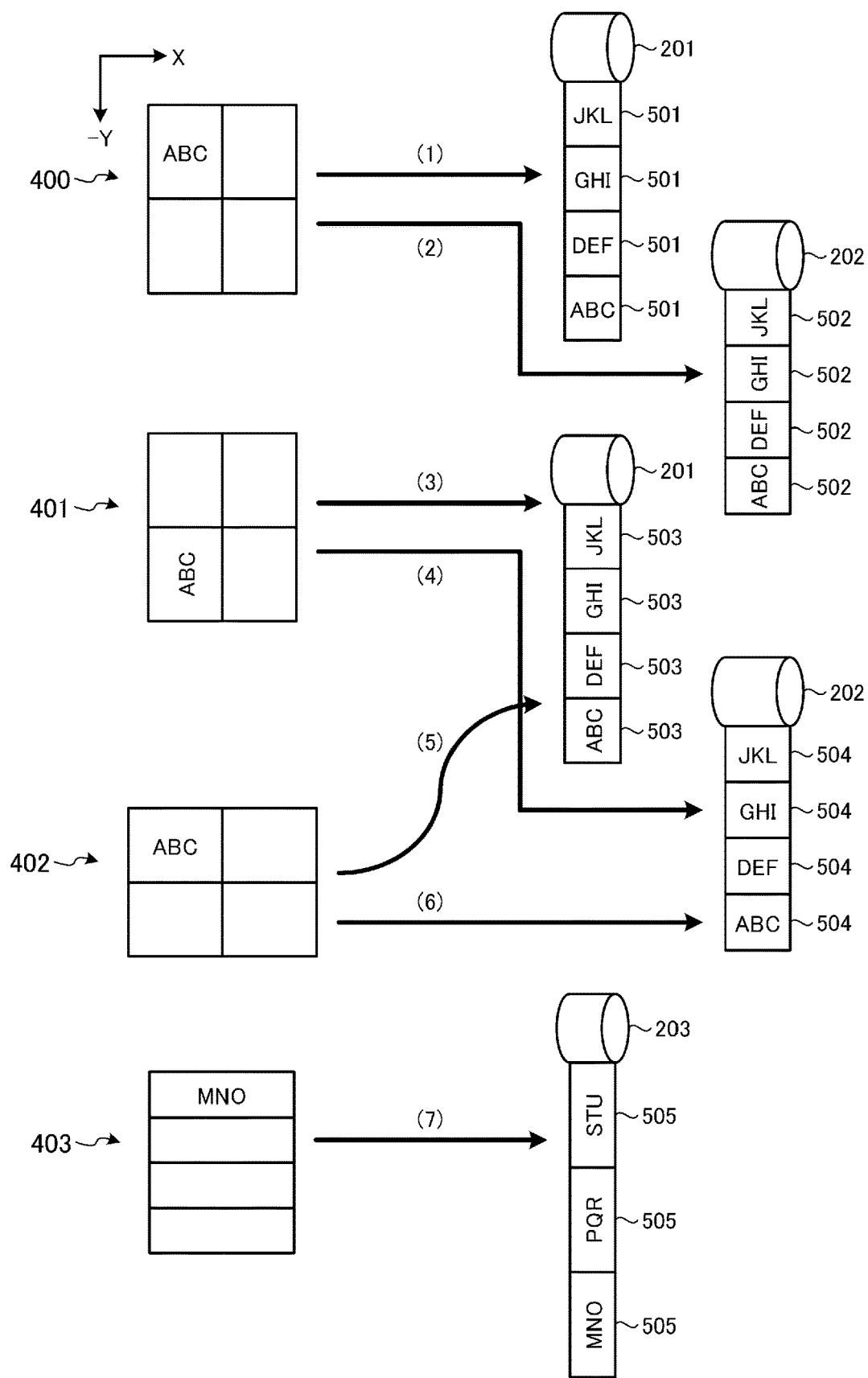
FIG. 7 is a diagram showing embodiments of conversion from various standard print data to various long sheets.

Here, the standard print data 400 shown in FIG. 7 is the same as that shown in FIG. 5A. Further, the standard print data 401 shown in FIG. 7 includes a horizontally long sheet in the standard sheet output in the vertically long form.

Further, the standard print data 402 includes a horizontally long sheet in the standard sheet output in the horizontally long form. The standard print data 403 includes a horizontally long sheet in the standard sheet output in the vertically long form.

Further, the long sheet 201 shown in FIG. 7 is the same as that shown in FIG. 5B and the long sides of the sheets are arranged in the conveyance direction. Further, the long sheet 202 shown in FIG. 7 is the same as that shown in FIG. 5C and the short sides of the sheet are arranged in the conveyance direction. Like the long sheet 201, the long sheet 203 has the long sides of the sheets arranged in the conveyance direction.

The control unit 110 first sets the sheet dimension 122 (ACT 1). That is, the control unit 110 stores set values of the standard print data 400 to 403 in the storage unit 120 as the sheet dimension 122. Further, the control unit 110 stores set values of the long sheets 201 to 203, which substitute for the standard sheet suitable for the standard print data 400, as the sheet dimension 122 in the storage unit 120. This is done by the user of the printer 1 operating the operation switch 15 while looking at, for example, the liquid crystal monitor 14. The input sheet dimension 122 is maintained in the storage unit 120 even if the power is cut off.

Next, the control unit 110 waits for the reception of the standard print data (No in ACT 2), and upon receiving the data (Yes in ACT 2), the control unit 110 checks the sheet dimension 122 stored in the storage unit 120 (ACT 3). Subsequently, the control unit 110, as the print data dividing unit 111, divides the standard print data 400 into sheets for each sheet according to the boundaries of the sheets included in the print data (ACT 4).

Next, the control unit 110 determines, as the width check unit 112, whether the width of the long sheet held by the sheet holding unit 20 is equal to or larger than the dimension of the long side of the sheet on the standard print data (ACT 5).

If the determination in ACT 5 is Yes, the control unit 110, as the orientation check unit 113, determines whether each sheet contained in the standard print data is long in the conveyance direction (Y-axis direction) (ACT 6).

Here, the determination in ACT 6 is Yes, for example, in the conversion examples (2) and (4) shown in FIG. 7. That is, the orientation of the sheet with respect to the conveyance direction changes. In this case, the control unit 110 rotates the divided print data as the rotation processing unit 114 so that the long side becomes the width (ACT 7). Then, the control unit 110, as the print processing unit 115, sequentially transmits the divided print data to the driver 141 and prints it (ACT 8).

Further, the determination in ACT 6 is No in, for example, the conversion example (6) shown in FIG. 7. In this case, the orientation of the sheet with respect to the conveyance direction does not change. Therefore, the control unit 110 skips ACT 7 and proceeds to ACT 8.

Next, if the determination in ACT 5 is No, the control unit 110, as the width check unit 112, determines whether the width of the long sheet held by the sheet holding unit 20 is equal to or larger than the dimension of the short side of the sheet on the standard print data (ACT 9).

If the determination in ACT 9 is Yes, the control unit 110, as the orientation check unit 113, determines whether each sheet contained in the standard print data is long in the conveyance direction (Y-axis direction) (ACT 10).

Here, the determination in ACT 10 is Yes, for example, in the conversion examples (5) and (7) shown in FIG. 7. That is, the orientation of the sheet with respect to the conveyance direction changes. In this case, the control unit 110, as the rotation processing unit 114, rotates the divided print data so that the short side becomes the width (ACT 11). Then, the control unit 110 advances the process to ACT 8.

Further, the determination in ACT 10 is No, for example, in the conversion examples (1) and (3) shown in FIG. 7. In this case, the orientation of the sheet with respect to the conveyance direction does not change. Therefore, the control unit 110 skips ACT 11 and advances the process to ACT 8.

If the determination in ACT 9 is No, since it means that the standard print data received in ACT 2 cannot be printed on the long sheet held by the sheet holding unit 20, the control unit 110 ends the present process as an error (ACT 12).

As described above, with the printer 1 according to the present embodiment, it is possible to obtain a desired output on a long sheet by using the print data premised on the print output to each of the areas obtained by dividing the standard sheet into a plurality of areas.

The above-described embodiment can be appropriately modified and implemented by changing a part of the configuration or function of each of the above-mentioned devices. Therefore, some modifications according to the above-described embodiment will be described below as other embodiments. In this description, the points different from the above-described embodiment will be mainly described, and the detailed description of the points common to the contents already described will be omitted. Further, the modifications described below may be carried out individually or in combination as appropriate.

Figure 8A:
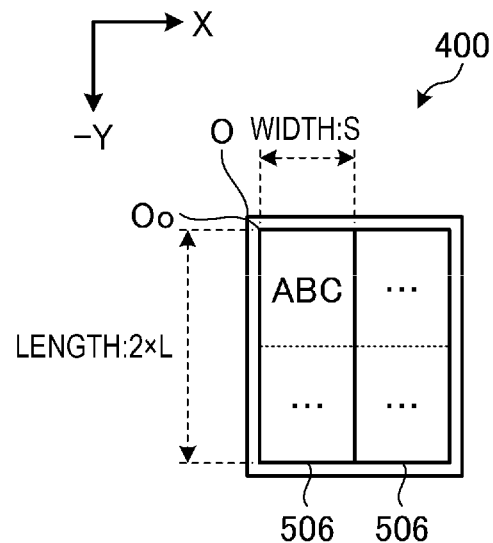
FIG. 8A is a diagram showing an embodiment in which the standard print data is divided into two vertical columns instead of four.

FIG. 8A is a diagram showing an embodiment in which the standard print data 400 is divided into two vertically instead of four. If the long sheet has a width corresponding to the width dimension S of the sheet (for example, the long sheet 201 shown in FIG. 5B), the standard print data 400 may be divided into two in the width direction, and the print data with the width of S and twice the length of L may be output to the driver 141.

According to this, although the output order of the sheets may be changed, the state of the sheets after the output can be as desired.

Figure 8B:
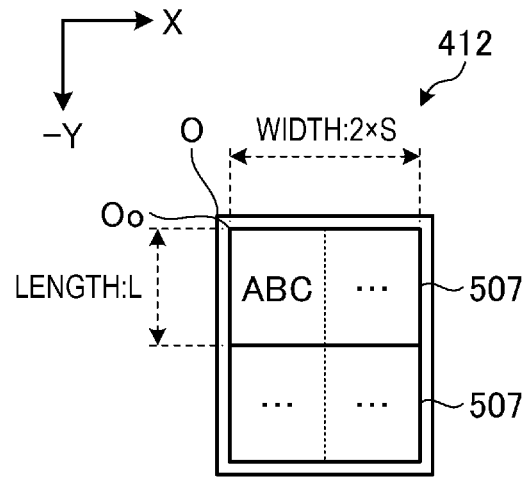
FIG. 8B is a diagram showing an embodiment in which the standard print data is divided into two horizontal rows instead of four.

FIG. 8B is a diagram showing an embodiment in which the standard print data 400 is divided into two horizontally instead of four. If the long sheet has a width corresponding to the length dimension L of the sheet (for example, the long sheet 202 shown in FIG. 5C), the standard print data 400 may be divided into two in the length direction and the print data having a width twice the width Sand the length L may be output to the driver 141.

According to this, although the output order of the sheets may change, the state of the sheets after output can be as desired.

The program executed by each device of the embodiment is provided by being incorporated in a ROM or the like in advance. The program executed by each device of the above-described embodiment may be configured to be recorded as a file in an installable format or an executable format and provided on a recording medium that can be read by a computer, such as a CD-ROM, a flexible disk (FD), a CD-R, or a DVD (Digital Versatile Disk).

Further, the program executed by each device of the above-described embodiment may be configured to be stored on a computer connected to a network such as the Internet and provided by downloading via the network. Further, the program executed by each device of the above-described embodiment may be configured to be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printer for printing on a long sheet, comprising:
a processor configured to output a plurality of segments of divided print data divided at the boundary of areas from standard print data containing print contents in each of the areas obtained by dividing a standard sheet into a plurality of the areas; and
configured to compare a size of the long sheet with a size of the area included in the standard sheet, and rotate the divided print data if it is determined from a result of the comparison that the rotation is necessary;
wherein the processor is further configured to:
check which of the short side and long side dimensions of the divided print data is suitable for a width dimension of the long sheet,
check whether a longitudinal direction of the divided print data in a readable orientation is suitable for a width direction or a length direction of the long sheet, and
rotate the divided print data if it is determined from outputs of the processor that the rotation is necessary.

2. The printer according to claim 1, wherein
the processor outputs the divided print data obtained by dividing the standard print data into adjacent predetermined numbers of the areas.

3. A method for causing a computer included in a printer that prints on a long sheet to function as
a processor that outputs a plurality of segments of divided print data divided at the boundary of areas from standard print data containing print contents in each of the areas obtained by dividing a standard sheet into a plurality of the areas; and
that compares a size of the long sheet with a size of the area included in the standard sheet and rotates the divided print data if it is determined from a result of the comparison that the rotation is necessary;
wherein the processor is further configured to:
check which of the short side and long side dimensions of the divided print data is suitable for a width dimension of the long sheet,
check whether a longitudinal direction of the divided print data in a readable orientation is suitable for a width direction or a length direction of the long sheet, and
rotate the divided print data if it is determined from outputs of the processor that the rotation is necessary.

4. The printer according to claim 3, wherein
the processor outputs the divided print data obtained by dividing the standard print data into adjacent predetermined numbers of the areas.

* * * * *